(12) United States Patent
Natanzon et al.

(10) Patent No.: US 10,747,621 B2
(45) Date of Patent: Aug. 18, 2020

(54) DATA MANAGEMENT AND BACKUP FOR IMAGE AND VIDEO MEDIA

(71) Applicant: EMC IP Holding Company LLC, Hopkinton, MA (US)

(72) Inventors: Assaf Natanzon, Tel Aviv (IL); Yossef Saad, Gannei Tikva (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 145 days.

(21) Appl. No.: 15/947,834

(22) Filed: Apr. 8, 2018

(65) Prior Publication Data

US 2019/0310919 A1    Oct. 10, 2019

(51) Int. Cl.
| | |
|---|---|
| *G06F 11/14* | (2006.01) |
| *G06F 16/43* | (2019.01) |
| *G06F 16/16* | (2019.01) |
| *G06F 16/174* | (2019.01) |
| *G06F 16/178* | (2019.01) |
| *G06F 12/02* | (2006.01) |
| *G06F 3/06* | (2006.01) |

(52) U.S. Cl.
CPC ........ *G06F 11/1448* (2013.01); *G06F 3/0604* (2013.01); *G06F 3/0623* (2013.01); *G06F 3/0638* (2013.01); *G06F 3/0643* (2013.01); *G06F 3/0683* (2013.01); *G06F 12/0238* (2013.01); *G06F 16/164* (2019.01); *G06F 16/1744* (2019.01); *G06F 16/1794* (2019.01); *G06F 16/43* (2019.01)

(58) Field of Classification Search
CPC .... G06F 3/0604; G06F 3/0623; G06F 3/0638; G06F 3/0643; G06F 3/0683; G06F 12/0238; G06F 12/0811; G06F 11/1448; G06F 16/164; G06F 16/1744; G06F 16/1794; G06F 16/185; G06F 16/43
See application file for complete search history.

(56) References Cited

U.S. PATENT DOCUMENTS 9,087,062 B2 * 7/2015 Bennett ................. G06F 16/113
2016/0085766 A1 * 3/2016 Kushtagi ............. G06F 16/1744
                                                        707/689

* cited by examiner

*Primary Examiner* — Aracelis Ruiz
(74) *Attorney, Agent, or Firm* — Barry N. Young

(57) ABSTRACT

The management and backup of image and video media is automatically performed by evaluating a media file to characterize the content; transforming the media file, as by compressing it, based upon its evaluation and established policies and requirements; and storing the transformed media file with a high resolution in a storage tier having first access characteristics for a first retention period. Following the first retention period, the stored file is re-evaluated and further transformed and stored with lesser resolution in another tier having different access characteristics for a second retention period. Subsequently, the further transformed media file may be transformed again and stored in archive storage.

17 Claims, 3 Drawing Sheets

DATA MANAGEMENT AND BACKUP FOR IMAGE AND VIDEO MEDIA

BACKGROUND

This invention relates generally to storage of media data files, and more particularly to the storage and management of image and video media data files in enterprise storage environments.

Many enterprises generate large numbers of video and image media data files. These may be medical, CT, MRI media or simply other types of videos and image media data. Such media data files may be subject to certain retention requirements established by regulatory regimes or other policies. For example, it may be necessary to retain some types of media data for a number of years, while other types of media data may have much shorter retention periods. Frequently, the enterprise system simply backs up such media data files in its data protection storage system in the same way as other data without regard to the type or content of the media data files and without treating the media data within the files as being special. Media data files such as image and video files consume significant amounts of data, and, accordingly, require significant amounts of storage capacity. Regular data files can be transformed and/or compressed with little or no loss in the accuracy of the data. Additionally, regular data files may be de-duplicated to eliminate duplicate copies of the same files to reduce storage requirements. Media data files, however, are typically not compressible, and de-duplication is possible only if the files are identical, which is generally not the case with media data files. Moreover, backup systems retain data in a lossless format. However, the significance of the content of the image and video media data and the need for timely access to the data content may diminish over time, making it unnecessary and inefficient to backup and store media data files in the same lossless way as general data. Thus, storing media data files in general purpose de-duplicated protection storage is not beneficial, and can be wasteful of resources and expensive.

Application awareness in data protection is a major part of the protection approaches today, but the focus is typically about integrating with the applications to obtain consistent point in time images for applications such as databases. Application point time images are usually managed by the backup software and allow the backup administrator to configure retention periods for each application image. However, the time value and the significance of the content of image and video media data may be difficult to predict, making it impractical to set either arbitrary or standardized retention periods for backup and storage of media data files. Today, there are no enterprise level management systems which permit managing image and video media files based upon their content in an efficient, compliant and automated manner.

It is desirable to provide systems and methods for the automatic management and backup of image and video media data that address the foregoing and other known problems of data protection for such media data, and it is to these ends that the present invention is directed.

DESCRIPTION OF PREFERRED EMBODIMENTS

This invention is particularly applicable to the management and backup of high volume content data such as image and video media data, and will be described in that context. It will be appreciated, however, that this is illustrative of only one utility of the invention and that the invention has applicability more generally to the management and backup of other types of data as well.

As will be described, the invention affords automatic systems and methods for evaluating and managing the backup and storage of media data in enterprise backup and storage systems to comply with the needs and policies of the enterprise and/or other organizations. The media data is evaluated and stored at a tier based upon the actual content of the media data, in accordance with fixed or changing policies established by the enterprise or to comply with other requirements. The data content may be evaluated with respect to predefined criteria. In some instances the data is transformed, as by being compressed or by being converted to a different format or structure and its resolution changed. Additionally, the data may be segmented into different parts that are stored in different types of storage or in different forms, and for different retention periods. At prescribed periods of time, the data content may be reevaluated for importance, further transformed or converted, and restored in the same or other storage. In an embodiment, metadata describing the media data may be generated and stored to facilitate fast searching to locate the actual data of interest, where the actual data content is stored in other storage.

Figure 1:
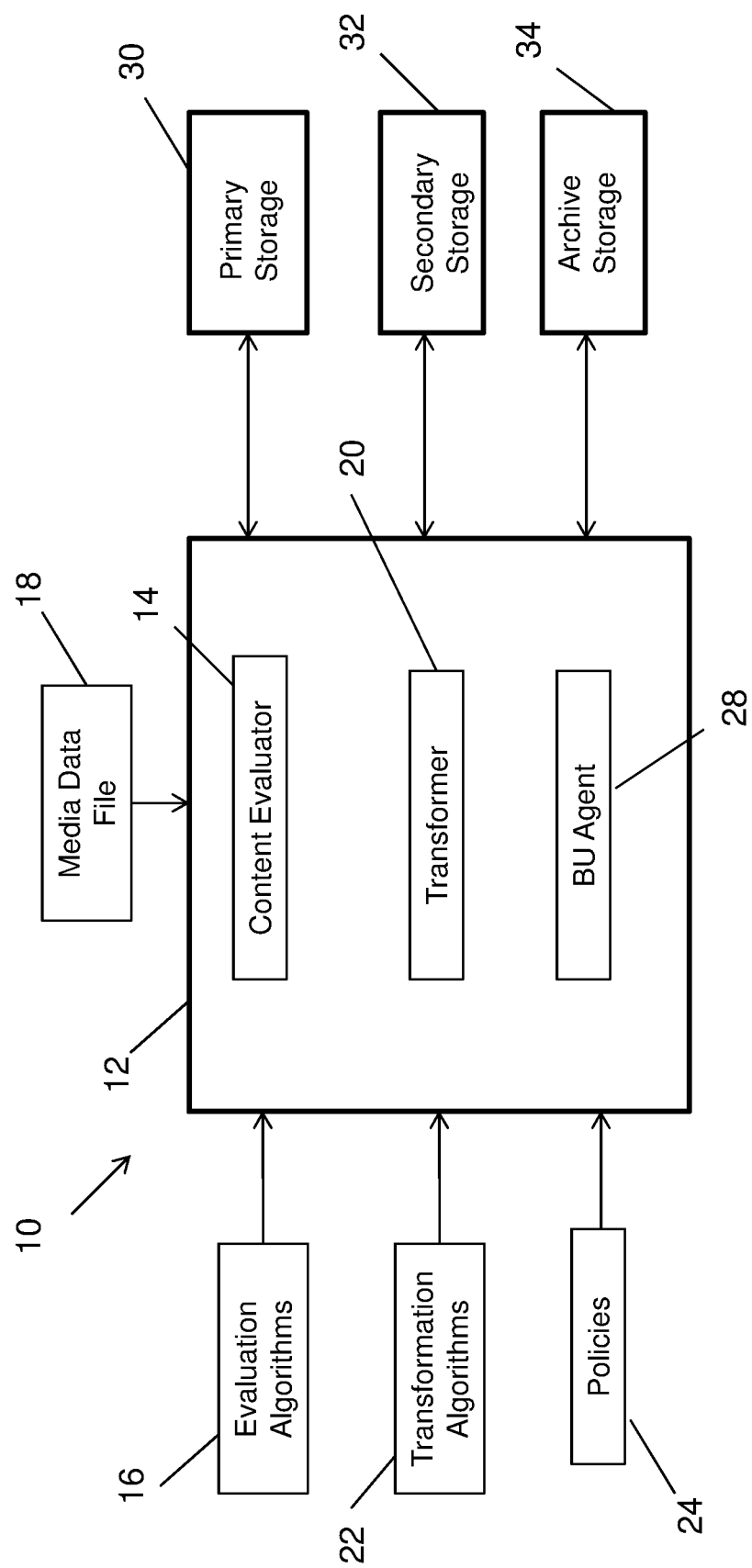
FIG. 1 is a block diagram of an embodiment of a system in accordance with the invention for managing media files.

FIG. 1 is a block diagram of a management system 10 in accordance with an embodiment of the invention for automatically evaluating and managing media data files such as images and video. System 10 may comprise a processing system 12 controlled by computer executable instructions stored in one or more memories to perform operations as described herein. The processing system 12 may comprise a content evaluator 14 that employs an analysis and evaluation algorithm from an algorithm library 16 to analyze and evaluate automatically and periodically the media data file 18 for the presence or absence of predetermined content. The content evaluator may also analyze and evaluate the content of the media file for its significance or importance based upon predetermined criteria. The evaluation algorithm used by the content evaluator may be an image processing algorithm or a machine learning algorithm that analyzes images of the media file for certain types of content. For instance, the algorithm may look for certain artifacts or conditions in medical scans such as X-ray, MRI or CT scans, or for persons, activity or movement in surveillance video. Based upon the results of the analysis and evaluation of the content, the system may apply different policies and transformations to the content, as will be described. The processing system 12 may further include a content transformer 20 that transforms the data content of the media data file based upon the results of the content evaluation and in accordance with policies using a transformation algorithm from a transformation library 22. Different transformations may be applied to media files, based upon its content and based upon policies and requirements. These may include, among others, for example, converting the file to a different format or structure, segmenting the file into different portions and storing or handling the portions in different ways, compressing the file at an object level, and converting the file to a different resolution. The processing system 12 may also include a backup agent 28 for handling the backup and storage of the media data file 18. The backup agent may apply a backup and storage policy from a policy library 24 that prescribes the types of transformations and storage to be applied to the content of the media data file 18. The management system 10 may also have different types of storage for storing media data in different storage tiers. The different types of storage may include primary storage 30, secondary storage 32, and archival storage 34, as shown in the figure. As will be described, this storage may comprise different storage technologies having different performance characteristics, such as access speed, and may be used for storing different types of content for different retention periods and with different resolutions.

Figure 2:
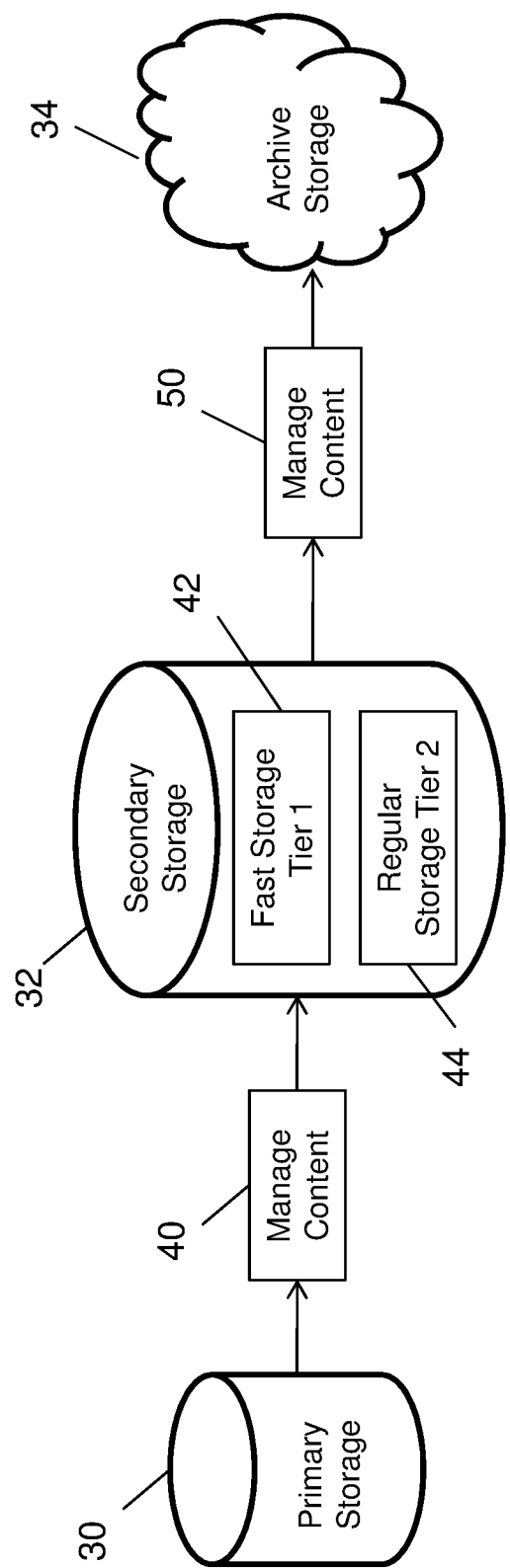
FIG. 2 is a diagrammatic view giving an overview of a method in accordance with the invention for managing and storing media data.

FIG. 2 is a diagrammatic view illustrating an overview of a method in accordance with the invention for transforming and storing content of media data files, and the figure shows how the different types of storage may be used by the invention.

Primary storage 30 may comprise conventional disk storage as well as memory, and may be the primary storage of the processing system 12. Primary storage 30 may be used for storing input data to the system, such as media files, and as a memory for processing operations performed by the processing system 12. A media data file 18, for example, that is input into the system 12 for processing may be initially stored in primary storage 30. After a given time period, the content of the media data file may be transformed at 40, as will be described, and the transformed content stored in secondary storage 32. As indicated in FIG. 2, secondary storage 32 may include different types of storage. It may include, for example, a fast storage tier 42 and a regular storage tier 44. The fast storage tier 42 may have fast data access, such as flash storage, but store data at a desired resolution, e.g., a high resolution, for a short period of time such as one week. The regular storage tier 44, on the other hand, may have somewhat slower data access and store the data at a different resolution, e.g., medium resolution, for a longer period of time, such as one month. After another selected retention period of time, media data in secondary storage 32, as, for example, in regular storage tier 44, may be further transformed, e.g., compressed, at 50 and stored in archive storage 34, such as cloud storage. Archive storage may be low resolution permanent storage or may be for another predetermined retention period, such as seven years.

As may be appreciated, secondary storage 32 may also contain other types of storage for storing media data with different resolutions and for different periods of time. At the end of each period of time (retention period), the data stored at a particular tier may be re-encoded and compressed or otherwise transformed with a different transformation algorithm, and re-stored with a different resolution.

As described above, image and video media files are large. Some of the data content may be more important than other content, and the importance or utility of the data content in the file may diminish with time. Surveillance cameras, for example, may produce huge amounts of data, much of which may be unimportant such as when there is no activity. It may only be for short periods of time when people are present or when the camera captures activity such as movement or other change that the data content of the media file becomes important. For such periods of activity, it may be important to retain the data in a high tier with the highest resolution (highest granularity) but slower access time to permit the content to be analyzed with a high degree of accuracy. For other periods of time, such as during an absence of interesting activity, the content may be of little interest or utility and may be stored in a lower tier with lower resolution (lower granularity) but higher access to facilitate faster searching. Since the value of the content of a surveillance video file may vary with time and have more or less importance depending upon what the camera captures, full access to the data and full resolution may not be required for the entire video file. Thus, the contents of the video file may be transformed at 40, and the transformed file may be stored in secondary storage 32. As will be described, the invention affords a system and method that automatically evaluates the contents of a media file, and automatically transforms and stores the contents in accordance with policies established by the enterprise or the user.

Different types of transformations may be applied to a video file. In one embodiment, a video file content may be compressed using progressive transmission encoding such as JPEG 2000, for example, to build a sequence of multiple copies of image data having progressively increasing resolution, and the sequences of images having different resolutions may be stored at different levels or tiers. Progressive transmission approaches, such as JPEG 2000, are particularly useful for compressing sequences of image data which does not change much between subsequent frames. They produce sequences of images having different resolutions which may be stored at different tiers of storage that offer different levels of searching and accommodate different resolution policies for backup media files.

Different retention policies may be created for backing up media files. For example, an enterprise may adopt a policy to keep a copy of a particular type of media data every day for a week, then keep only a weekly copy for a month, and later keep monthly copies for several years. Other policies may be adopted for different types of data. In some cases policies may be based upon regulatory requirements. The retention periods also may be selected to comply with different retention policies established by the enterprise or by others, and by the capacity of the protection storage system.

In an embodiment, policies may be created for retaining media files at different resolutions for different retention periods based upon the content of the media file. For instance, a policy may require retaining a media file of medical images at a resolution sufficient to permit analysis for a period of seven years. Policies may apply to changing resolution and retention requirements over time. A policy may dictate, for instance, keeping a file in the highest resolution tier for a retention period of one year, then reducing the resolution to one-half ($\frac{1}{2}$) after one year, and then reducing the resolution to one-fourth ($\frac{1}{4}^{th}$) after three years. In another embodiment focused on accessibility to backup data, the policy may be to keep the media file in multiple resolutions in multiple tiers. For example, the policy may dictate keeping the file at high resolution on fast storage for one day. After one day, a portion of the media file may be retained at one-fourth ($\frac{1}{4}^{th}$) resolution on fast storage, and the rest on slower secondary storage. After one month, fast storage portion may be reduced to one-eighth ($\frac{1}{8}^{th}$) resolution and the rest of the file maintained on archive storage, such as Amazon, or tier data to Data Domain cloud. In another embodiment, for media data such as surveillance video where for long periods of time nothing of interest occurs, the policy may segment the media file into different portions based upon the activity in the content, and the different portions may be stored with different resolutions (or in some cases deleted altogether) for different periods of time. In yet other embodiments, a policy may enable a user to define and apply other types of data transformations to the backup data after each period of time. Media data which has no interesting changes for a given period of time may be removed. For example, surveillance camera backup data which has no activity during a period of time, such as a week, may be removed. Additionally, a user may provide a transformation algorithm of the user's own choosing or design to transform the data, and may establish other data retention periods for different data.

Figure 3:
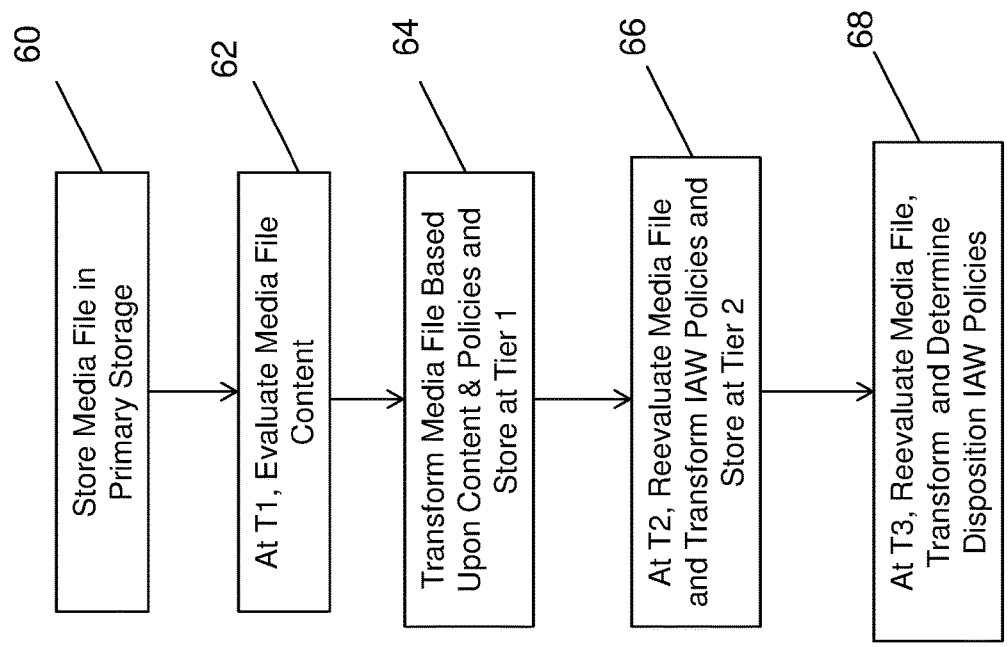
FIG. 3 is a block diagram illustrating a process in accordance with the invention for managing media data.

FIG. 3 is a block diagram of a process in accordance with an embodiment of the invention for management and backup of image and video media data. The process of FIG. 3 is preferably performed automatically by the management system 10 of FIG. 1 to analyze and evaluate the content of a media data file using machine learning and other evaluation algorithms, and to transform and store the content at different tiers of storage and for different retention periods based upon the content and established policies.

Referring to FIG. 3, at 60 a file containing media data such as images and video may be initially stored in primary storage of the processing system. The file may be stored in its entirety and with full resolution in the primary storage. At step 62, after a predetermined period of time T1 the content of the media file may be automatically analyzed and evaluated by the processing system using one or more analysis and evaluation algorithms, including machine learning algorithms. The analysis and evaluation of the content may characterize, for example, the significance, the importance and/or the utility of activities in or the subject matter of the content or of certain portions of the content. At 64, based upon the evaluated content, and in accordance with policies applicable to such content, the media file may be processed and managed and transforming as by converting the file to a different format or structure, or by compressing the file, as previously described, and the processed content stored in a tier 1 storage having a predetermined access performance at a predetermined resolution. As described above, the content may be stored in its entirety as one file having a particular resolution in one storage tier, or the content may be segmented into different files and each segment stored with a different resolution in a different storage tier based upon the segment content and the policies.

At 66, after a predetermined period of time, at time T2 the processing system may reanalyze and evaluate the stored content from the media file using the same or other analysis and evaluation algorithms, and transform and store the media file in a different tier 2 storage having another predetermined access performance and at another predetermined resolution. As described above, the file may be stored in its entirety in the tier 2 storage with a particular resolution, or a portion of the file may be stored at the tier 2 storage and other portions of the file may be stored in different storage tiers with different resolutions.

At 68, after another predetermined period of time, at time T3 the content of the media file (or files) stored at step 66 may be reevaluated and restored at an appropriate storage tier and with an appropriate resolution, or otherwise disposed of in accordance with the established policies.

The processing system 12 may have a daemon that runs automatically at the selected times to cause the processing system to execute the foregoing process to enforce the data protection policies of the enterprise, and to convert the data to different formats and store it in different storage tiers, as described.

While the foregoing description has been with respect to particular embodiments, it will be appreciated that changes may be made to these embodiments without departing from the principles of the invention, the scope of which is defined by the appended claims.

The invention claimed is:

1. A method of managing storage and backup of image and video media data, comprising automatically:
   evaluating content of a media data file using a content evaluation algorithm;
   transforming the media data file based upon said evaluating of the content and in accordance with predefined policies applicable to the evaluated content;
   storing the transformed media data file in a first storage tier at a first resolution;
   after a first predetermined time, further evaluating the content of said transformed media data file stored at said first storage tier, further transforming the media data file in accordance with said policies, and storing the further transformed media file in a second storage tier with a second resolution; and
   after a second predetermined time, again evaluating said further transformed media data file for additional transforming and storing or for other disposition.

2. The method of claim 1, wherein said evaluating comprises analyzing said media file for the presence or absence of a predetermined type of content.

3. The method of claim 2, wherein said predetermined type of content comprises one of a predetermined type of content in an image or a predetermined type of activity in a video.

4. The method of claim 1, wherein said transforming comprises converting a format and structure of the media file to another format and structure having different content and different resolution.

5. The method of claim 1, wherein said transforming comprises compressing said media file by using an encoding algorithm.

6. The method of claim 5, wherein said compressing comprises encoding the media file using a progressive transmission algorithm that progressively produces a sequence of images having increased pixel resolution and image resolution.

7. The method of claim 1, wherein said transforming comprises segmenting the media file into separate portions based upon content, and deleting from storage after predetermined retention periods the portions having no content of interest.

8. The method of claim 1, wherein said transforming comprises constructing metadata describing the content of the media file, storing the metadata in fast access storage for content searching, and storing the content of the media file at high resolution in a slow access first tier storage for content analysis.

9. Non-transitory computer readable media embodying executable instructions for controlling operations of a computer to perform a method comprising:
   evaluating content of a media data file using a content evaluation algorithm;
   transforming the media data file based upon said evaluating of the content and in accordance with predefined policies applicable to the evaluated content;
   storing the transformed media data file in a first storage tier at a first resolution;

after a first predetermined time, further evaluating the content of said transformed media data file stored at said first storage tier, further transforming the media data file in accordance with said policies, and storing the further transformed media file in a second storage tier with a second resolution; and after a second predetermined time, evaluating said further transformed media data file for additional transformation and storage or for other disposition.

10. The non-transitory computer readable media of claim 9, wherein said evaluating comprises analyzing said media file for the presence or absence of a predetermined type of content in an image or a predetermined type of activity in a video.

11. The non-transitory computer readable media of claim 9, wherein said transforming comprises converting a format and structure of the content of the media file by compressing the content and changing the resolution of the stored content.

12. The non-transitory computer readable media of claim 11, wherein said compressing the content and changing the resolution comprises encoding the media file using a progressive transmission algorithm that progressively produces a sequence of images having increased pixel resolution and image resolution.

13. The non-transitory computer readable media of claim 12, wherein said encoding comprises encoding the media file using JPEG 2000 encoding to create images having different resolutions, and storing the images for different retention periods.

14. The non-transitory computer readable media of claim 9, wherein said transforming comprises segmenting the media file into separate portions based upon content, storing the portions in storage, and deleting from storage after predetermined retention periods the portions having no content of interest.

15. The non-transitory computer readable media of claim 9, wherein said transforming comprises constructing metadata describing the content of the media file, storing the metadata in fast access storage for content searching, and storing the content of the media file at high resolution in a slow access first tier storage for content analysis.

16. A system for automatically managing storage and backup of image and video media data, comprising:

a processing system executing a first evaluation algorithm for evaluating content of a media file, and executing a second transformation algorithm for transforming the content based upon the first evaluation of the media file and predetermined policies to produce a first transformed content;

a multi-tier storage system comprising different tiers of storage, each tier having different access characteristics;

a backup agent for storing the first transformed content in a first tier of said storage system with a resolution determined by said predetermined policies, the first tier of storage having fast access characteristics;

a daemon controlling the processing system to repeat successive evaluations, transformations and storage of media content at increasing levels of access and resolution in tiers of said multi-tier storage system.

17. The system of claim 16, wherein said multi-tier storage system comprises primary memory of the processing system; a first tier of flash memory having fast access; a second tier of conventional storage having moderate access; and an archival tier of cloud storage having slow access.

* * * * *